United States Patent
Farrell

(10) Patent No.: US 11,897,587 B1
(45) Date of Patent: Feb. 13, 2024

(54) CONVERTIBLE SEATING SYSTEM WITH RAISED SEATING SURFACE FOR MARINE VESSELS

(71) Applicant: Brunswick Corporation, Mettawa, IL (US)

(72) Inventor: Kevin Farrell, New Smyrna Beach, FL (US)

(73) Assignee: Brunswick Corporation, Mettawa, IL (US)

( * ) Notice: Subject to any disclaimer, the term of this patent is extended or adjusted under 35 U.S.C. 154(b) by 379 days.

(21) Appl. No.: 17/400,971

(22) Filed: Aug. 12, 2021

Related U.S. Application Data

(60) Provisional application No. 63/119,875, filed on Dec. 1, 2020.

(51) Int. Cl.
  *B63B 29/04* (2006.01)
  *B60N 2/30* (2006.01)

(52) U.S. Cl.
  CPC ............. *B63B 29/04* (2013.01); *B60N 2/30* (2013.01); *B63B 2029/043* (2013.01)

(58) Field of Classification Search
  CPC ... B63B 29/00; B63B 29/04; B63B 2029/043; B60N 2/00; B60N 2/02; B60N 2/005; B60N 2002/0204; B60N 2/24; B60N 2/30; B60N 2/68
  USPC .......................................... 114/343, 363, 364
  See application file for complete search history.

(56) References Cited

U.S. PATENT DOCUMENTS

| | | | |
|---|---|---|---|
| 4,030,436 A * | 6/1977 | Stoberl | B63H 9/1007 297/333 |
| 4,567,845 A | 2/1986 | Smith | |
| 4,775,187 A | 10/1988 | Herr | |
| 4,843,999 A | 7/1989 | Kobus et al. | |
| 5,052,076 A | 10/1991 | Spaeth | |
| 5,320,059 A * | 6/1994 | Ikeda | B63B 29/04 297/94 |
| 5,799,605 A | 9/1998 | Huse | |
| 6,945,190 B1 | 9/2005 | Frandsen | |
| 7,302,906 B2 | 12/2007 | Burroughs et al. | |
| 7,367,616 B2 | 5/2008 | Summerford | |
| 7,513,211 B1 | 4/2009 | Farb et al. | |
| 8,109,563 B2 | 2/2012 | Hansen | |
| 8,113,136 B2 | 2/2012 | Mayrand et al. | |
| 8,517,466 B1 | 8/2013 | WiZorek et al. | |
| 8,801,099 B2 | 8/2014 | Ebel et al. | |
| 8,899,169 B1 | 12/2014 | Jaziri | |

(Continued)

*Primary Examiner* — Daniel V Venne
(74) *Attorney, Agent, or Firm* — Andrus Intellectual Property Law, LLP

(57) ABSTRACT

A convertible seating system for a marine vessel that is movable between a stowed configuration and a deployed configuration is provided. The convertible seating system includes a backrest component that is pivotably coupled to a recessed compartment formed in a deck portion of the marine vessel, and a seat component that is pivotably coupled to the recessed compartment. The seat component is flush with the deck portion when the convertible seating system is in the stowed configuration and the deployed configuration. The seat component further pivots upwardly from the deck portion to permit the backrest component to pivot upwardly from inside the recessed compartment in the stowed configuration to outside the recessed component in the deployed configuration.

20 Claims, 12 Drawing Sheets

(56) References Cited

U.S. PATENT DOCUMENTS

| | | |
|---|---|---|
| 9,021,975 B1 | 5/2015 | Fodor et al. |
| 9,073,608 B1 | 7/2015 | Foss et al. |
| 9,260,166 B1 | 2/2016 | Fodor et al. |
| 9,821,887 B1 | 11/2017 | Wilson et al. |
| 10,065,711 B2 | 9/2018 | Fuller, IV et al. |
| 10,065,713 B2 | 9/2018 | Murphy |
| 10,085,566 B1 | 10/2018 | Gallant |
| 10,486,777 B1 | 11/2019 | Barbier et al. |
| 10,569,841 B2 | 2/2020 | Fuller, IV et al. |
| 2007/0114819 A1 | 5/2007 | Dougherty |
| 2010/0018451 A1* | 1/2010 | Sahr ................ B63B 29/04 114/363 |
| 2010/0037814 A1 | 2/2010 | Sahr et al. |

* cited by examiner

CONVERTIBLE SEATING SYSTEM WITH RAISED SEATING SURFACE FOR MARINE VESSELS

CROSS-REFERENCE TO RELATED APPLICATION

The present application claims the benefit of and priority to U.S. Provisional Application Ser. No. 63/119,875, filed Dec. 1, 2020, which application is hereby incorporated by reference in its entirety.

FIELD

The present disclosure relates to marine vessels and watercraft, and more particularly, pertains to a convertible seating system for marine vessels and watercraft that is provided with a raised seating surface.

BACKGROUND

U.S. Pat. No. 5,799,605 discloses an expandable seat and storage unit particularly adapted for use in a boat. The expandable seat has a base unit which defines a storage area. A frame is slidably mounted within the base and can slide with respect to the base to expand the length of the seat to form a bed. The frame is locked into the base by the back cushion of the seat. By removing the back cushion, the frame section can be slid out of the base and then the back cushion can be used along with the seat cushion to form a bed. The frame has side members which extend generally perpendicular from the side edges of the front face of the frame and ride in tracks formed in the base unit. The tracks are along the sides of the base unit and do not interfere with the storage area. Further, the tracks are formed integrally in the base unit to facilitate easy inexpensive manufacture and operation.

U.S. Pat. No. 7,513,211 discloses a seat assembly for use in boats. The seat assembly includes a pair of seating platforms with a reclining seat back and a sliding seat bottom. A removable section is inserted between the seat bottom and the seat back to create a long recliner. A central panel and pad are set between the seating platforms to create a large surface area sunpad. The seating platforms are hollow to allow for storage of the central panels and pads and the removable sections.

U.S. Pat. No. 8,517,466 discloses a convertible boat seat that transforms from a standard bench-style seat configuration capable of accommodating multiple occupants to a lounger that allows a single occupant to comfortably lounge without impeding into the available deck space. A convertible boat seat comprises a chaise lounge type seat having a plurality of configurable components including a two-piece back rest, a configurable armrest, a hinging bench seat assembly, and an inclined chaise end forming a lounge backrest adapted with a pivoting armrest. The two-piece backrest includes first and second backrest components that are each configurable between a raised position and a lowered position. The inclined chaise end includes a pivoting armrest configurable between a stowed, out-of-the-way position, and a deployed position wherein it functions as a lounge armrest. A hinging bench seat includes first and second hingedly connected seat components that are configurable between a generally flat configuration for bench seating and a raised configuration wherein the lounger's knees are supported in a partially bent lounging position. On an opposing end of the inclined chaise end is an armrest configurable between a raised position wherein it functions as an armrest when the seat is configured for bench-style seating, and a lowered position wherein it is stowed generally flush with the bench seat surface for providing increased leg room while lounging.

U.S. Pat. No. 8,899,169 discloses a platform for a vessel that includes integrated and stowable seating. The platform comprises a platform surface, at least one seating recess, and at least one seat back panel. The seating recess is disposed below the platform surface. The seat back panel has an inner surface and an opposing outer surface and is pivotably attached to the seating recess to provide a plurality of operative positions, including an open seating position and a closed position. In the closed position, the outer surface of the seat back panel is substantially flush with respect to the platform surface, providing a continuous and unobstructed boarding/swimming platform. The open seating position provides an aftward seating configuration. Both the seating recess and seat back panel can removably receive cushions for added comfort and support of the user. The configuration maximizes usable platform space when the seat back panels are closed.

U.S. Pat. No. 9,021,975 discloses a seating system for marine vessels and watercraft including a chair having a backrest and a seat bottom and a lounge extension element wherein a first end of the extension element is hingeably attached to and extends from the seat bottom and wherein a second end of the extension element is configured to be hingeably attached to a first rigid structure such as a bulkhead on a watercraft. The seating system is convertible between a forward-facing seat configuration and an aft-facing lounger configuration. In the aft-facing lounger configuration, the extension element and the seat bottom are substantially parallel to one another. In the forward-facing seat configuration, the extension element is substantially upright and at an acute angle with respect to said seat bottom.

U.S. Pat. No. 9,073,608 discloses a seating system for watercraft having a base supporting a seating surface and a backrest pivotably attached to the base. The backrest pivots about the seating surface to provide a plurality of selectable seating positions. The backrest is pivotably attached to the base by an arm attached to the side of the backrest. The arm engages a guide member attached to the base, the guide member having one or more positional slots corresponding to the plurality of selectable seating positions. The backrest can be positioned upright, at an angle, or flat with respect to the seating surface to provide a plurality of seating configurations including simultaneous forward and aft seats, an aft-facing lounge seat and a sunpad. The seating surface comprises hingeable seat cushions permitted access to storage compartments inside the base. The seating system can be installed adjacent to a bulkhead on a watercraft to provide an aft-facing lounge seat.

U.S. Pat. No. 9,260,166 discloses a seat for a marine vessel capable of multiple positions while maintaining a hidden or concealed look when closed. The seat has a seat back hingeably attached to a seat bottom and a seat back cap hingeably attached to a leading edge of the seat back. The seat is operable between a plurality of selected positions including an open position and a closed position. In the open position, the seat back is upright and the seat provides at least one traditional seating surface. In the closed position, the seat back rests substantially parallel on the seat bottom and a rear surface of the seat back functions as a sun pad. In the closed position, the seat back cap is deployed over a leading edge of the seat bottom and the leading edge of the seat back to conceal the seat. A positionable leg extension pad extends from the seat bottom.

U.S. Pat. No. 9,821,887 discloses a convertible seating system for a marine vessel includes a frame and a seat mounted on the frame and defining a first support surface. A backrest is configured for movement relative to the seat and the frame between a first position and a second position. In the second position, the backrest defines a second support surface lying generally parallel and vertically displaced relative to the first support surface.

U.S. Pat. No. 10,085,566 discloses a marine vessel that has a deck surface having a recessed cavity; a seat module having a seating member, an engagement member, and a hinge that couples the seating member to the engagement member; and a retainer configured to retain the engagement member with respect to the recessed cavity. The seating member is pivotable about the hinge into and between a closed position in which the seating member lies flush with the deck surface and covers the recessed cavity and an open position in which the seating member provides seating for user and the recessed cavity is exposed and provides leg room for the user.

U.S. Pat. No. 10,486,777 discloses a seating system that includes a base, and a seat mounted on the base and defining a seating surface. A backrest is configured for movement relative to the base and the seat between a first position and a second position by a backrest transfer arrangement having a movable pivot axis configuration. In the second position, the backrest defines a working surface spaced above and lying generally parallel to the seating surface.

Each of the above patents is hereby incorporated herein by reference in its entirety.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one example of the present disclosure, a convertible seating system for a marine vessel that is movable between a stowed configuration and a deployed configuration is provided. The convertible seating system includes a backrest component that is pivotably coupled to a recessed compartment formed in a deck portion of the marine vessel, and a seat component that is pivotably coupled to the recessed compartment. The seat component is flush with the deck portion when the convertible seating system is in the stowed configuration and the deployed configuration. The seat component further pivots upwardly from the deck portion to permit the backrest component to pivot upwardly from inside the recessed compartment in the stowed configuration to outside the recessed component in the deployed configuration.

According to another example of the present disclosure, a convertible seating system for a marine vessel is provided that is movable between a stowed configuration and a deployed configuration. The convertible seating system includes a seat component that is pivotably coupled to a first end of a recessed compartment formed in a deck portion of the marine vessel, and a backrest component that is pivotably coupled to a second end of the recessed compartment, where the second end is opposite the first end. Moving the convertible seating system from the stowed configuration to the deployed configuration includes pivoting the seat component upwardly from the deck portion in a first direction to permit the backrest component to pivot upwardly in a second direction, where the second direction is opposite the first direction.

According to yet another example of the present disclosure, a method of converting a seating system for a marine vessel between a stowed configuration and a deployed configuration is provided. The method includes pivoting a seat component upwardly in a first direction from a seat stowed position in which the seat component is flush with a deck portion of the marine vessel. Pivoting the seat component upwardly permits a backrest biasing component to assist in pivoting a backrest component upwardly in a second direction from a backrest stowed position within a recessed compartment formed in the deck portion. The method further includes pivoting the seat component downwardly to the stowed position.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity, and understanding. No unnecessary limitations are to be inferred therefrom beyond the requirement of the prior art because such terms are used for descriptive purposes only and are intended to be broadly construed.

Existing convertible seating systems for marine vessels often include folding backrests that are pivoted downwardly to provide a flat casting sterndeck surface and pivoted upwardly to reveal a seating surface that is recessed below the sterndeck surface. Although simple to implement, the present inventor has recognized that recessed seating surfaces have poor ergonomics and are uncomfortable. Therefore, the convertible seating systems of the present disclosure include a seating base that is flush or level with the sterndeck surface in both stowed and deployed configurations, resulting in more favorable ergonomics and more comfortable travel. Advantageously, as described below, the mechanics of the convertible seating system disclosed herein permit the backrest to be raised using a gas spring or a tether system as the seating base is pivoted upwardly, bringing the seating system into a deployed position through minimal actions performed by the user.

Figure 1:
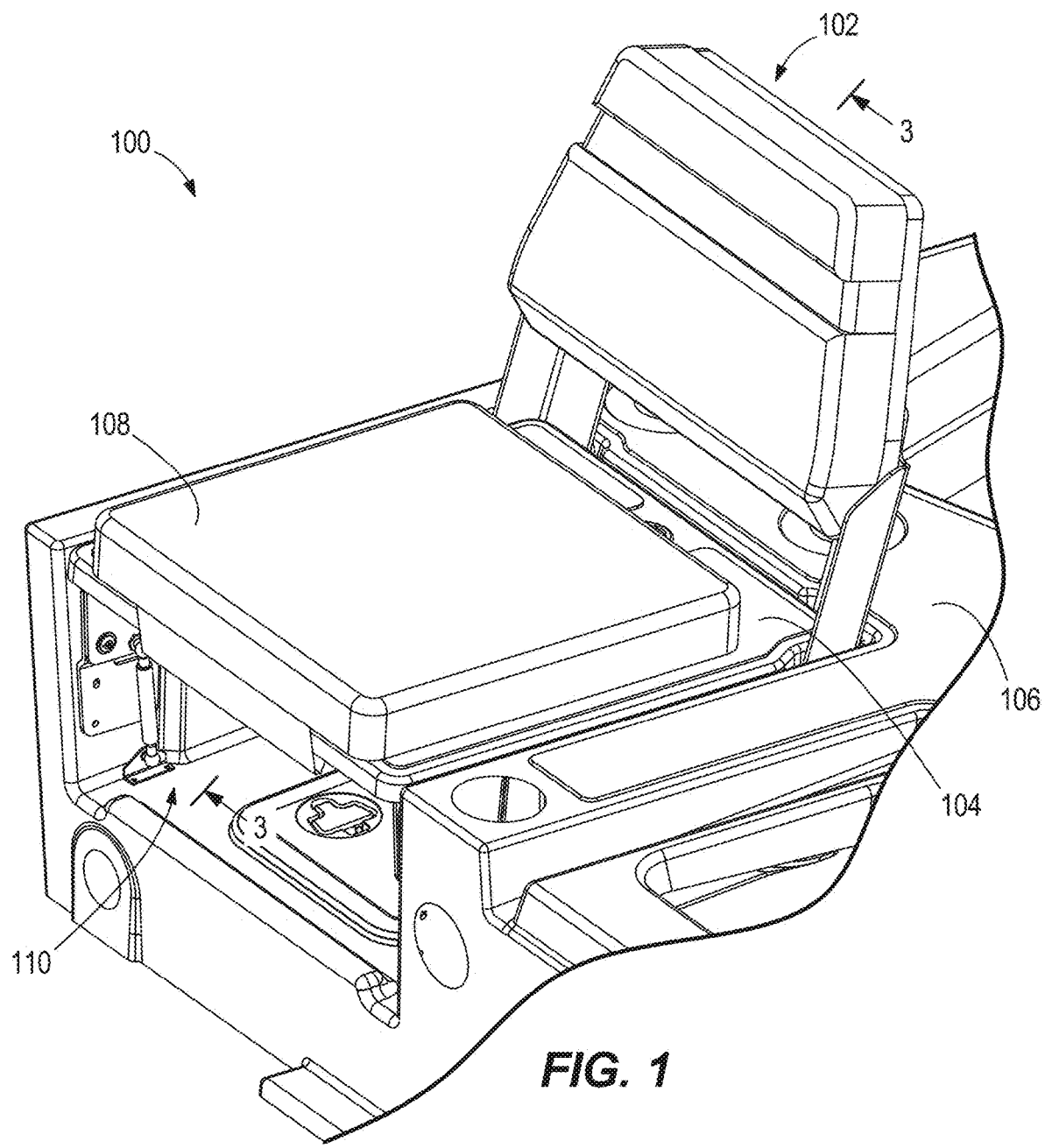
FIG. 1 is a perspective view of a boat provided with a convertible seating system in accordance with the present disclosure and showing a deployed configuration.
Figure 2:
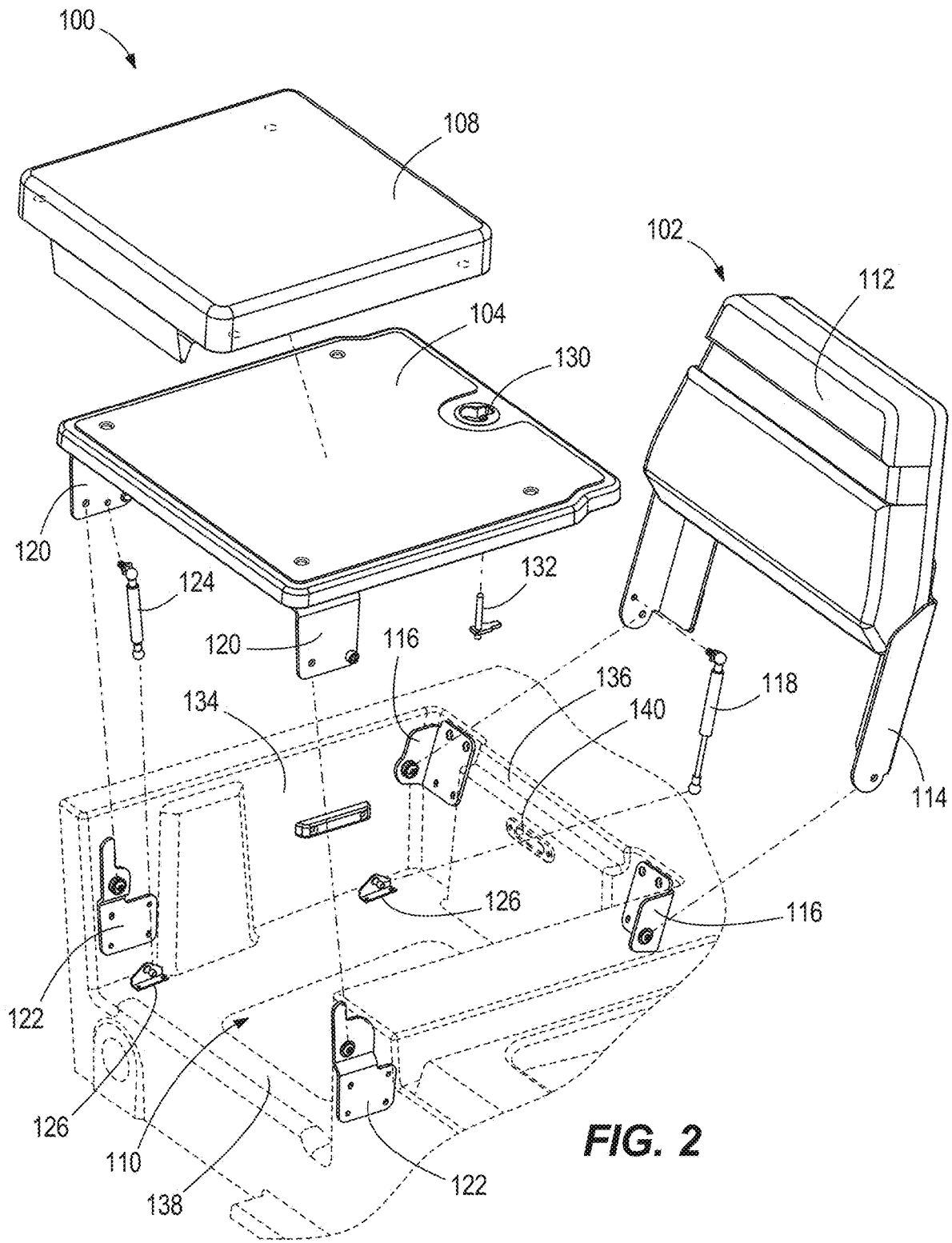
FIG. 2 is an exploded view of the convertible seating system of FIG. 1.
Figure 3:
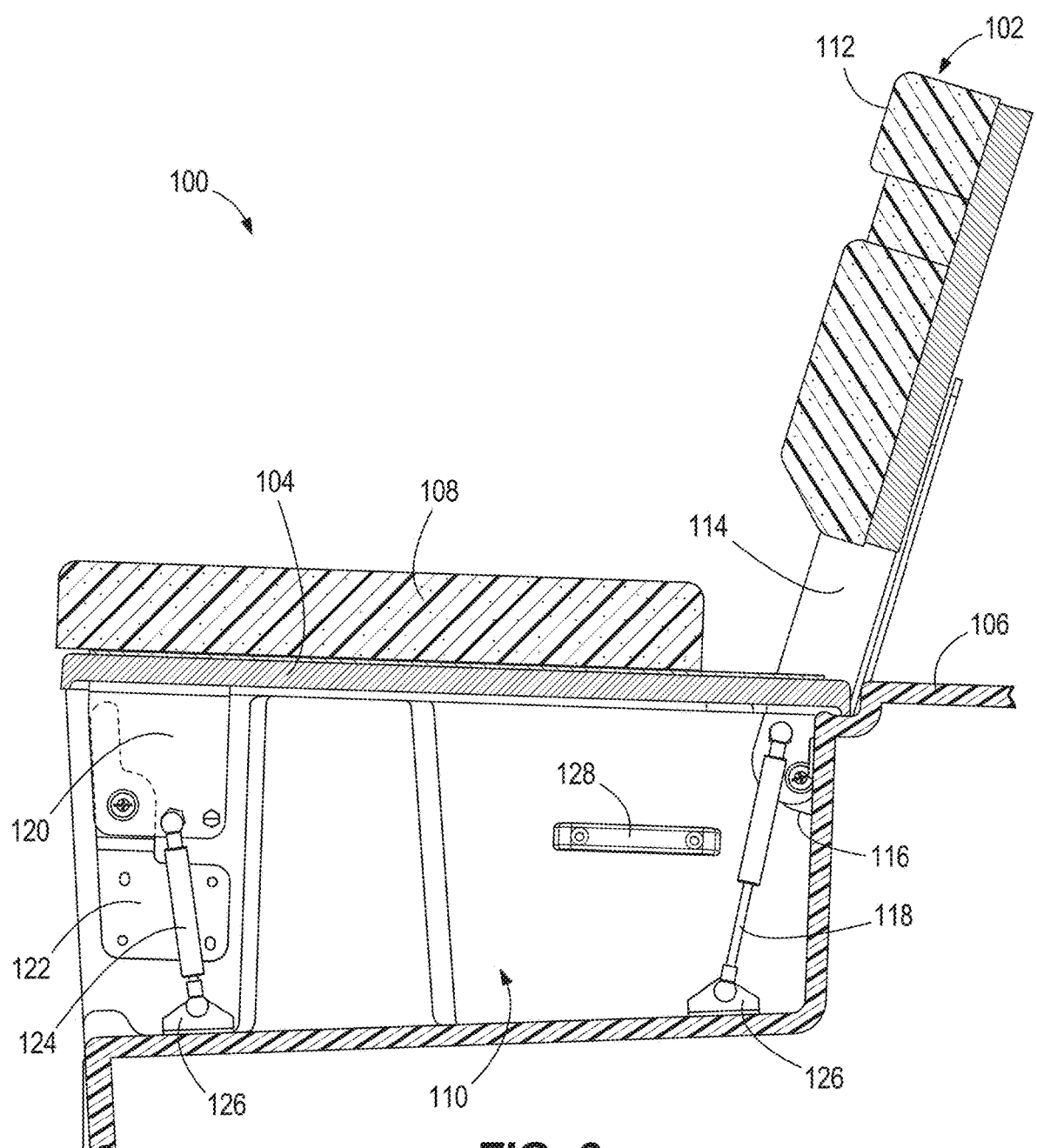
FIG. 3 is a side cross-sectional view of the convertible seating system in the deployed configuration taken along the line 3-3 of FIG. 1.

FIGS. 1-3 illustrate a convertible seating system 100 for a marine vessel in accordance with an exemplary embodiment of the present disclosure. Specifically, FIG. 1 depicts a perspective view of the convertible seating system 100 in a deployed configuration, FIG. 2 depicts an exploded view of the convertible seating system 100, and FIG. 3 depicts a side cross-sectional view of the system 100 in the deployed configuration. The convertible seating system 100 is shown to be generally comprised of a backrest component 102 and a seat component 104. The seat component 104 is shown to be flush with a deck surface 106 and a removable seat cushion 108 is situated atop the seat component 104. The seat component 104 is positioned above a recessed deck compartment 110. In the stowed configuration (depicted in FIG. 7), both the backrest component 102 and the seat cushion 108 are located within the deck compartment 110 to provide a generally flat deck surface 106.

As best shown in FIGS. 2 and 3, the backrest component 102 includes a backrest cushion 112 coupled to a backrest frame 114. Unlike the seat cushion 108, which may be detachably coupled to the seat component 104 using snaps or magnets, the backrest cushion 112 may be fixedly coupled to the backrest frame 114. The backrest frame 114 is pivotably coupled to a rear wall 136 of the deck compartment 110 using a pair of backrest compartment brackets 116. Pins or other similar fastening members included on the backrest compartment brackets 116 permit the backrest component to 102 to rotate between a deployed configuration (shown in FIGS. 1 and 3) and a stowed configuration (shown in FIGS. 6 and 7) in which the backrest component 102 is stowed or located within the deck compartment 110. A backrest stop component 128 is shown to be coupled to one of the side walls 134 of the deck compartment 110. The backrest stop component 128 may be any size or shape required to arrest rotation of the backrest frame 114 of the backrest component 102 once it reaches the fully stowed configuration (shown in FIGS. 6 and 7).

The seat component 104 is shown to be coupled to a pair of seat base brackets 120 that extend downwardly from the seat component 104 and into the deck compartment 110. The seat base brackets 120 are used to pivotably couple the seat base 104 to the side walls 134 of the deck compartment 110 using a pair of seat compartment brackets 122. Pins or other similar fastening members included on the seat base brackets 120 permit the seat component 104 to pivot upwardly to a transitional configuration (shown in FIGS. 4 and 5) that permits the backrest component 102 to pivot between the deployed and stowed configurations. The seat component 104 may be restrained from pivoting upwardly by a cam 132 that is configured to fit in a cam slot 140 formed in the rear wall 136 of the deck compartment 110. When a user grasps and rotates a cam latch 130 in the seat component 104 that is coupled to the cam 132, the cam 132 rotates out of the cam slot 140, and the seat component 104 can freely rotate upwardly into the transitional configuration (shown in FIGS. 4 and 5).

To aid in moving the backrest component 102 and the seat component 104 between the various configurations depicted in FIGS. 1-7, a backrest gas spring 118 is shown to be coupled to the backrest frame 114, and a seat base gas spring 124 is shown to be coupled to one of the seat base brackets 120. Each of the gas springs 118, 124 is a push-type gas spring in which pressure in a cylinder of the gas spring acts to extend a piston rod of the gas spring. In other words, the piston rods of the gas springs 118, 124 are biased to be in extended positions out of the cylinders, and force is required to push the piston rods into retracted positions within the cylinders. Further details of the operation of the gas springs 118, 124 are included below with reference to FIGS. 3-6. In an exemplary implementation, each of the gas springs 118, 124 is secured to a bottom wall 138 of the deck compartment 110 using a gas spring bracket 126.

Figure 4:
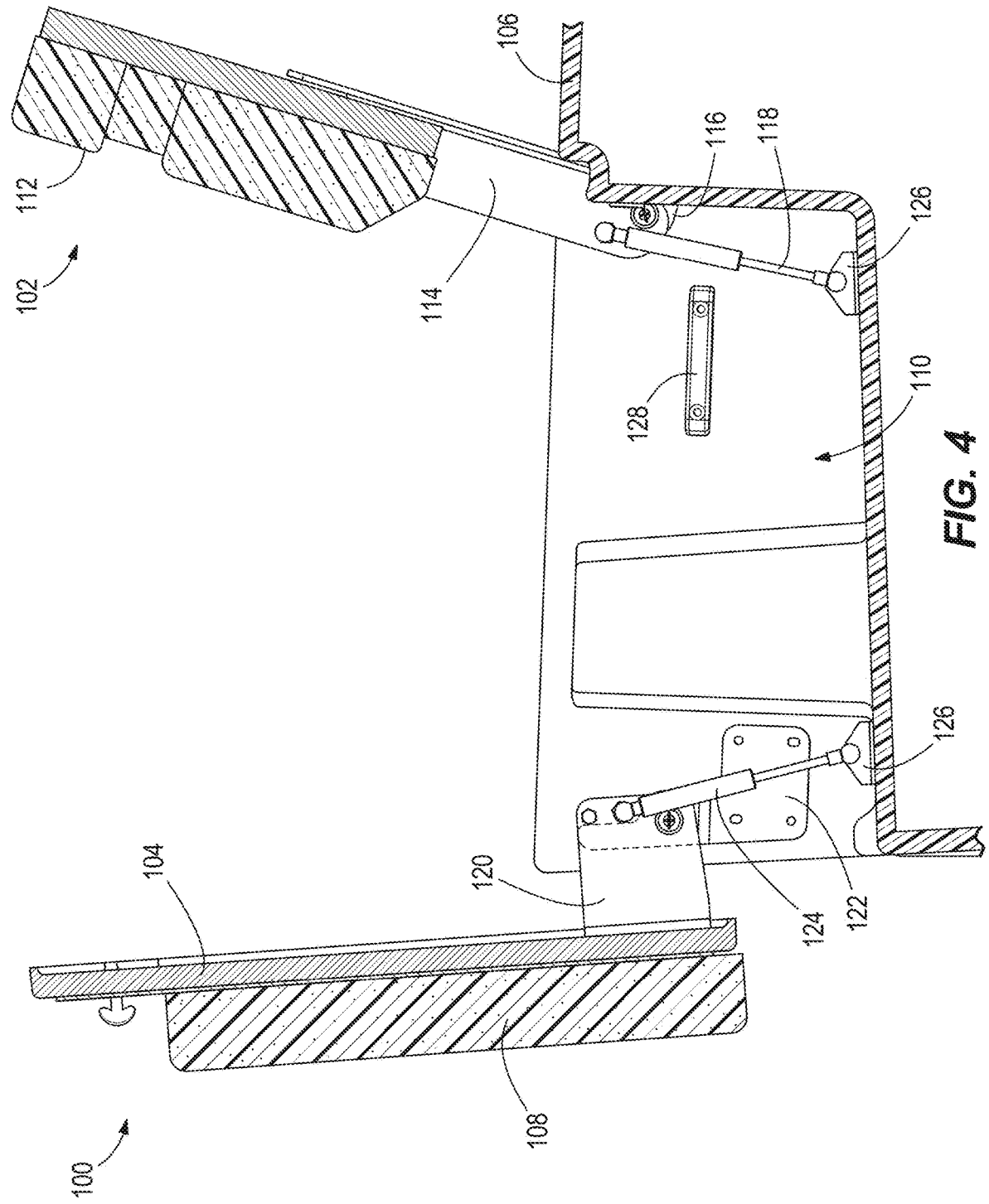
FIG. 4 is a side cross-sectional view of the convertible seating system of FIG. 1 in a partially stowed configuration.
Figure 5:
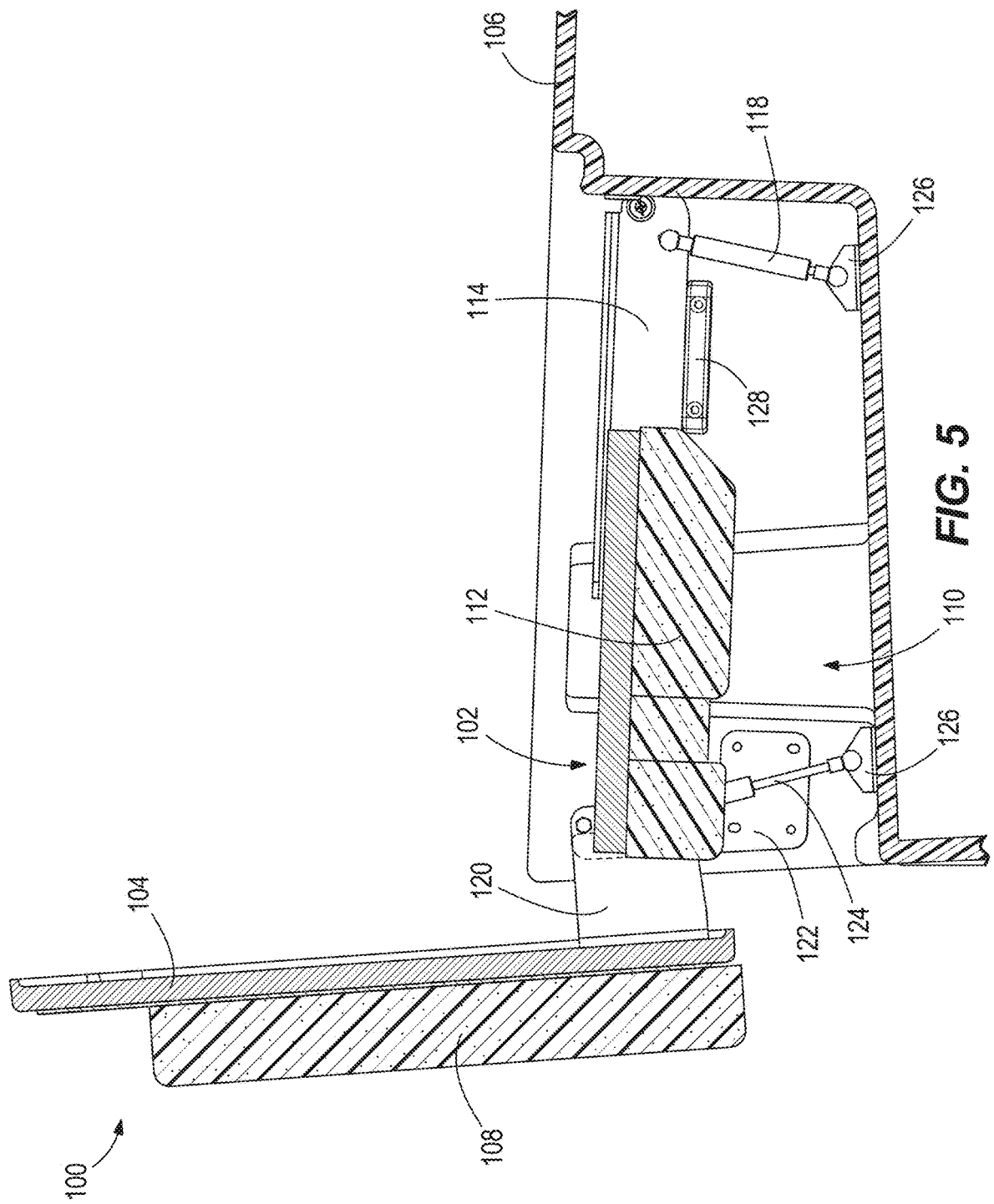
FIG. 5 is another side cross-sectional view of the convertible seating system of FIG. 1 in a partially stowed configuration.
Figure 6:
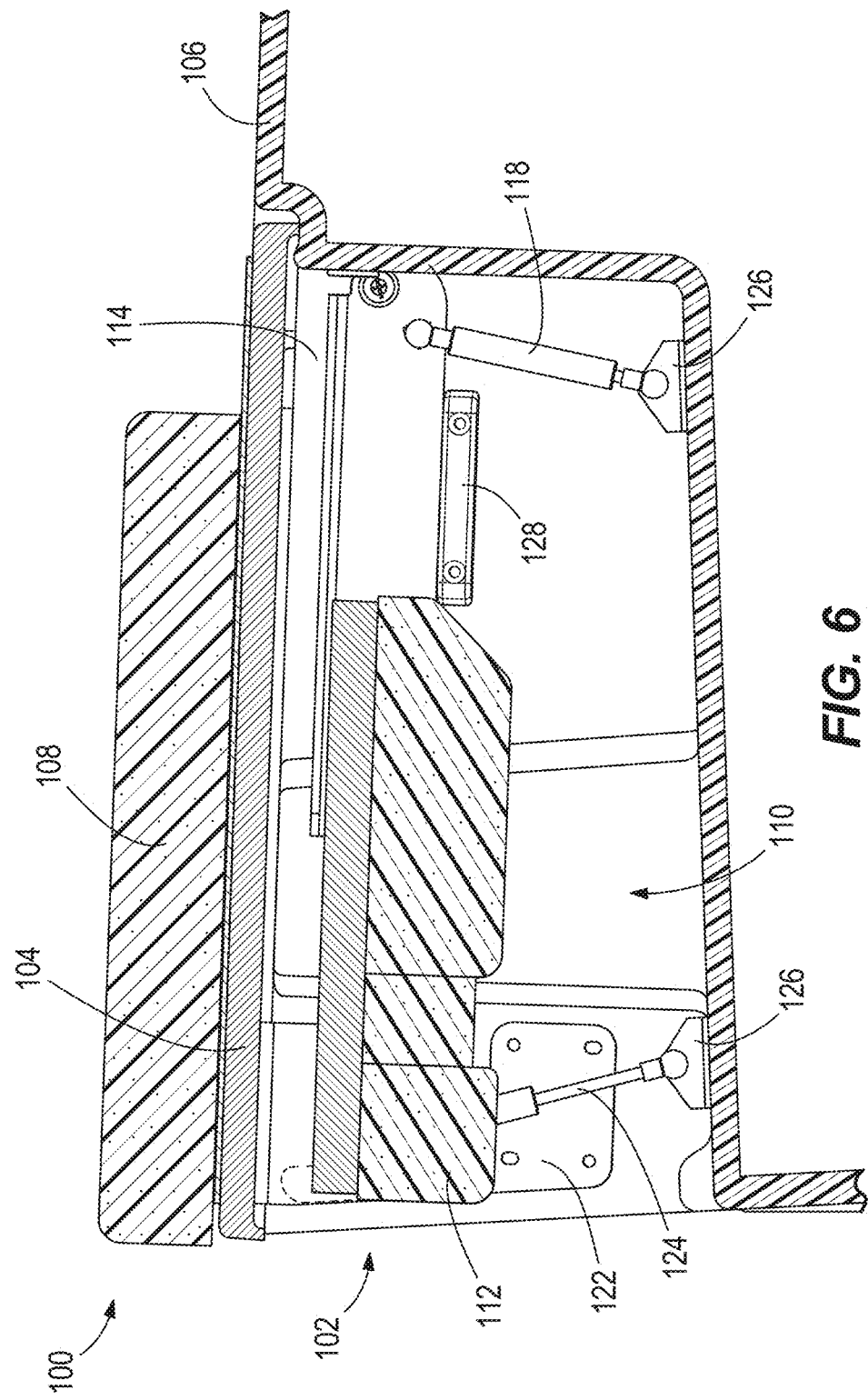
FIG. 6 is another side cross-sectional view of the convertible seating system of FIG. 1 in a partially stowed configuration.
Figure 7:
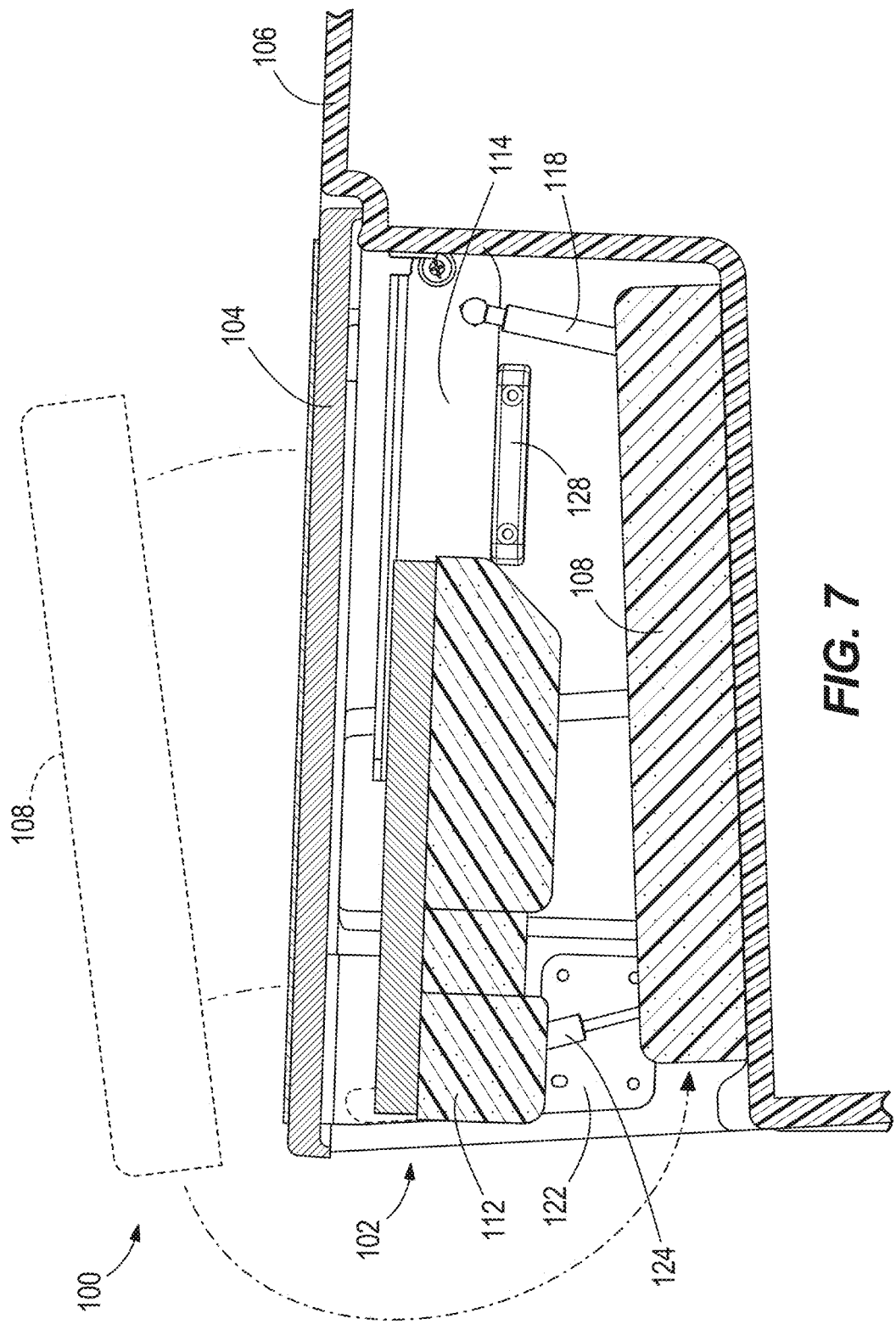
FIG. 7 is a side cross-sectional view of the convertible seating system of FIG. 1 in a fully stowed configuration.

Referring now to FIGS. 3-7, a series of side cross-sectional views depict the elements of the convertible seating system 100 as it transitions from the deployed configuration (depicted in FIG. 3) to the stowed configuration (depicted in FIG. 7). Upon rotating the cam 132 out of the cam slot 140 using the cam latch 130, the seat base gas spring 124 extends from the retracted position to the extended position, causing the seat component 104 to pivot upwardly to the transitional configuration, as shown in FIG. 4. By rotating the seat component 104 to the transitional configuration, a user can exert a downward force on the backrest component 102 to cause the piston rod of the backrest gas spring 118 to slide into the retracted position and the backrest component 102 to rotate into the deck compartment 110 until the backrest frame 114 contacts the backrest stop component 128, as shown in FIG. 5.

Once the backrest component 102 is in the stowed configuration, the user can exert a downward force on the seat component 104 to cause the piston rod of the seat base gas spring 124 to slide into the retracted position and the seat component 104 to rotate downwardly until it is flush with the deck surface 106, as shown in FIG. 6. To lock the backrest component 102 and the seat component 104 in the stowed configuration, the user can rotate the cam 132 into the cam slot 140 using the cam latch 130. Finally, as depicted in FIG. 7, the user detaches the removable seat cushion 108 using the fastening mechanisms (e.g., snaps, magnets) and stows the seat cushion 108 in the deck compartment 110 underneath the stowed seat component 104 to provide a substantially flat and contiguous stern surface between the seat component 104 and the deck surface 106.

Figure 8:
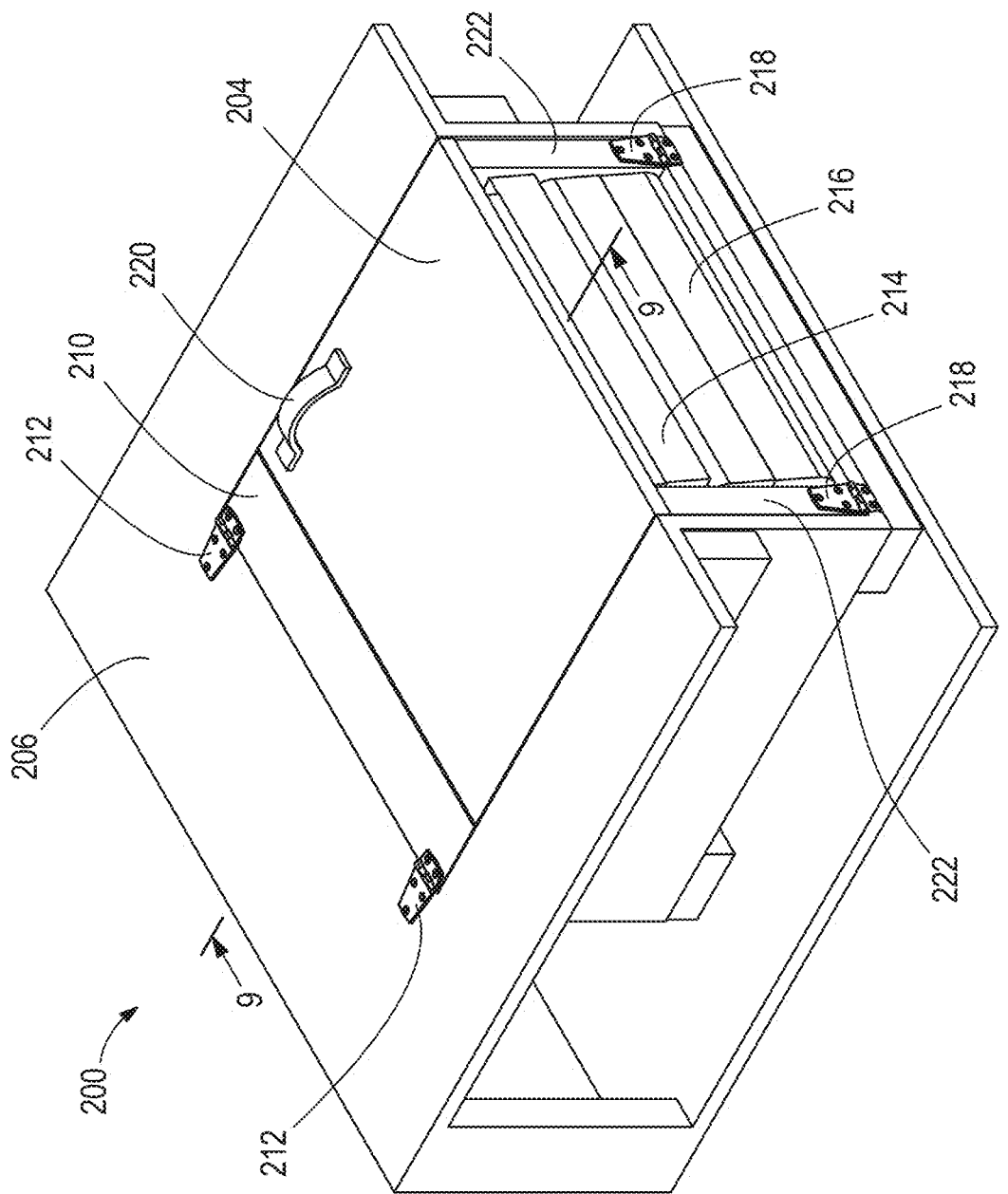
FIG. 8 is a perspective view of another convertible seating system in accordance with the present disclosure and depicting a stowed configuration.
Figure 9:
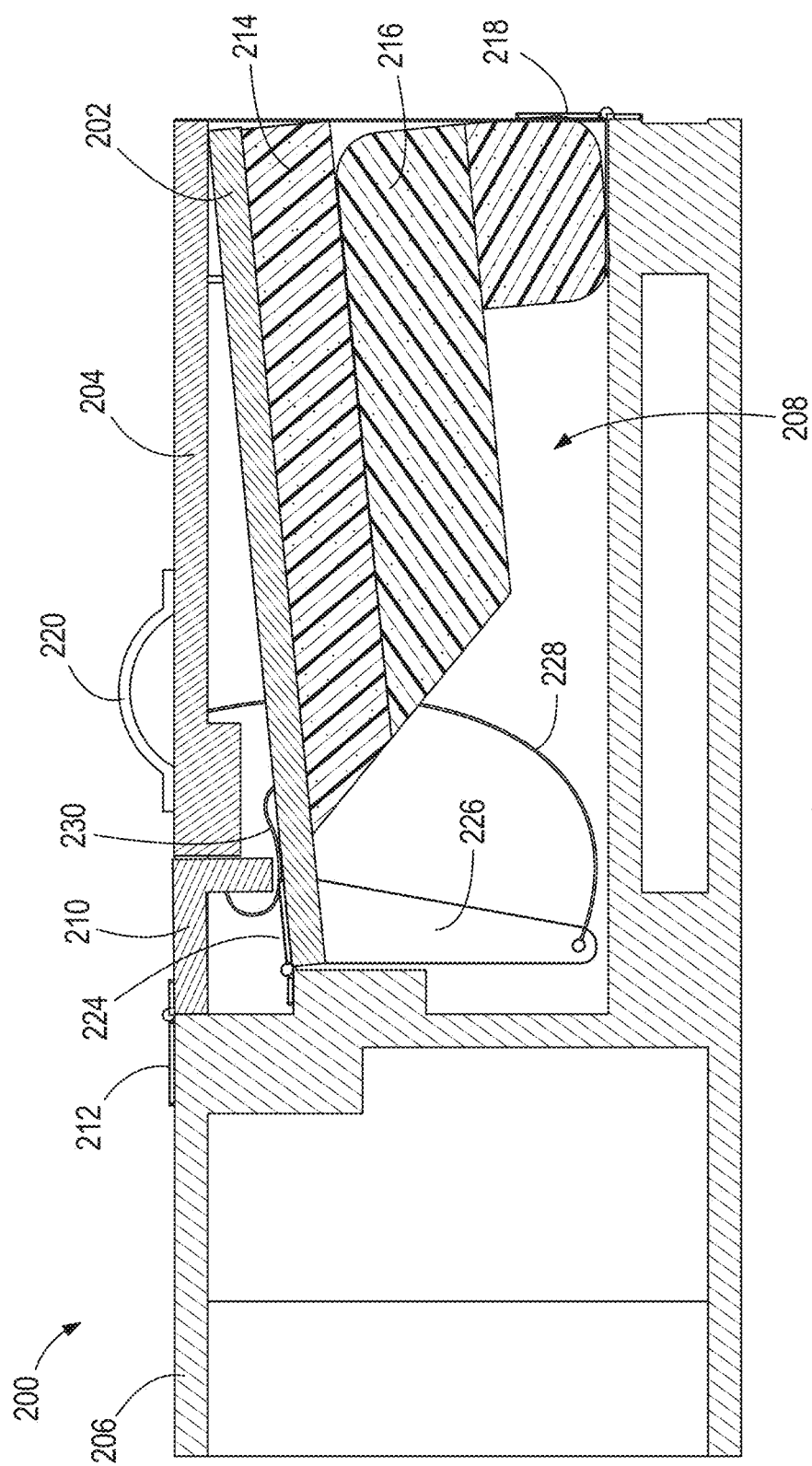
FIG. 9 is a side cross-sectional view of the convertible seating system in the stowed configuration taken along the line 9-9 of FIG. 8.

FIGS. 8 and 9 illustrate a convertible seating system 200 for a marine vessel in accordance with another exemplary embodiment of the present disclosure. Specifically, FIG. 8 depicts a perspective view of the convertible seating system 200 in a stowed configuration and FIG. 9 depicts a side cross-sectional view of the system 200 in the stowed configuration. The convertible seating system 200 is shown to be generally comprised of a backrest component 202 and a seat component 204. While in the stowed configuration, the seat component 204 is flush with the deck surface 206 and a deck component 210 of the marine vessel, and the backrest component 202 resides within a recessed compartment 208 that is formed below the deck surface 206.

The seat component 204 is coupled to a pair of legs 222 that extend downwardly into the recessed compartment 208. The legs 222 may be pivotably coupled to a bottom wall of the recessed compartment 208 using a pair of seat hinges 218. As best shown in FIG. 9, the backrest component 202 is pivotably coupled to a rear wall of the recessed compartment 208 using a pair of backrest hinges 224. The deck component 210 is shown to be generally L-shaped and to be pivotably coupled to the deck surface 206 using a pair of aft hinges 212. The hinges 212, 218, 224 may be any style of heavy duty hinge and is not particularly limited.

Figure 10:
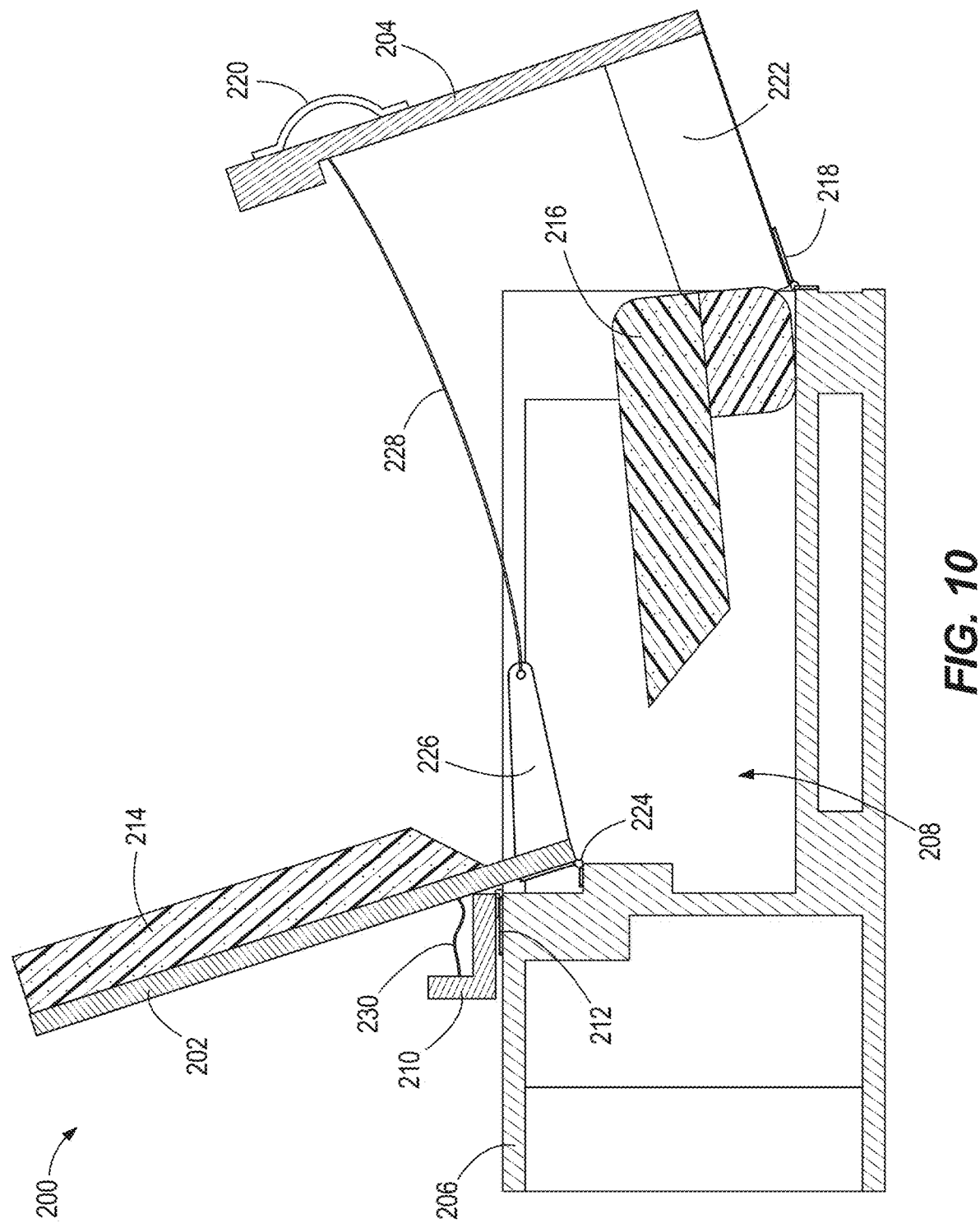
FIG. 10 is a side cross-sectional view of the convertible seating system of FIG. 8 in a partially deployed configuration.

The backrest component 202 is coupled to a tether bracket 226 that is generally orthogonal to the backrest component 202 and extends downwardly into the recessed compartment 208. A first tether 228 is shown to be coupled at a first end to the tether bracket 226 and at a second end to the seat component 204. As depicted in FIG. 10, when a user grips a handle 220 coupled to the seat component 204 and pivots the seat component 204 upwardly via the seat hinges 218, the first tether 228 is tensioned and causes the backrest component 202 to rotate into the deployed configuration from the stowed configuration via the backrest hinges 224. As the backrest component 202 rotates, a second tether 230 that is coupled at a first end to the backrest component 202 and at a second end to the deck component 210 is tensioned and causes the deck component 210 to rotate upwardly via the aft hinges 212 (see FIG. 10). Once the backrest component 202 and the deck component 210 have been rotated upwardly into the deployed configuration, the user can rotate the seat component 204 downwardly using the handle 220 to a position flush with the deck surface 206.

Figure 11:
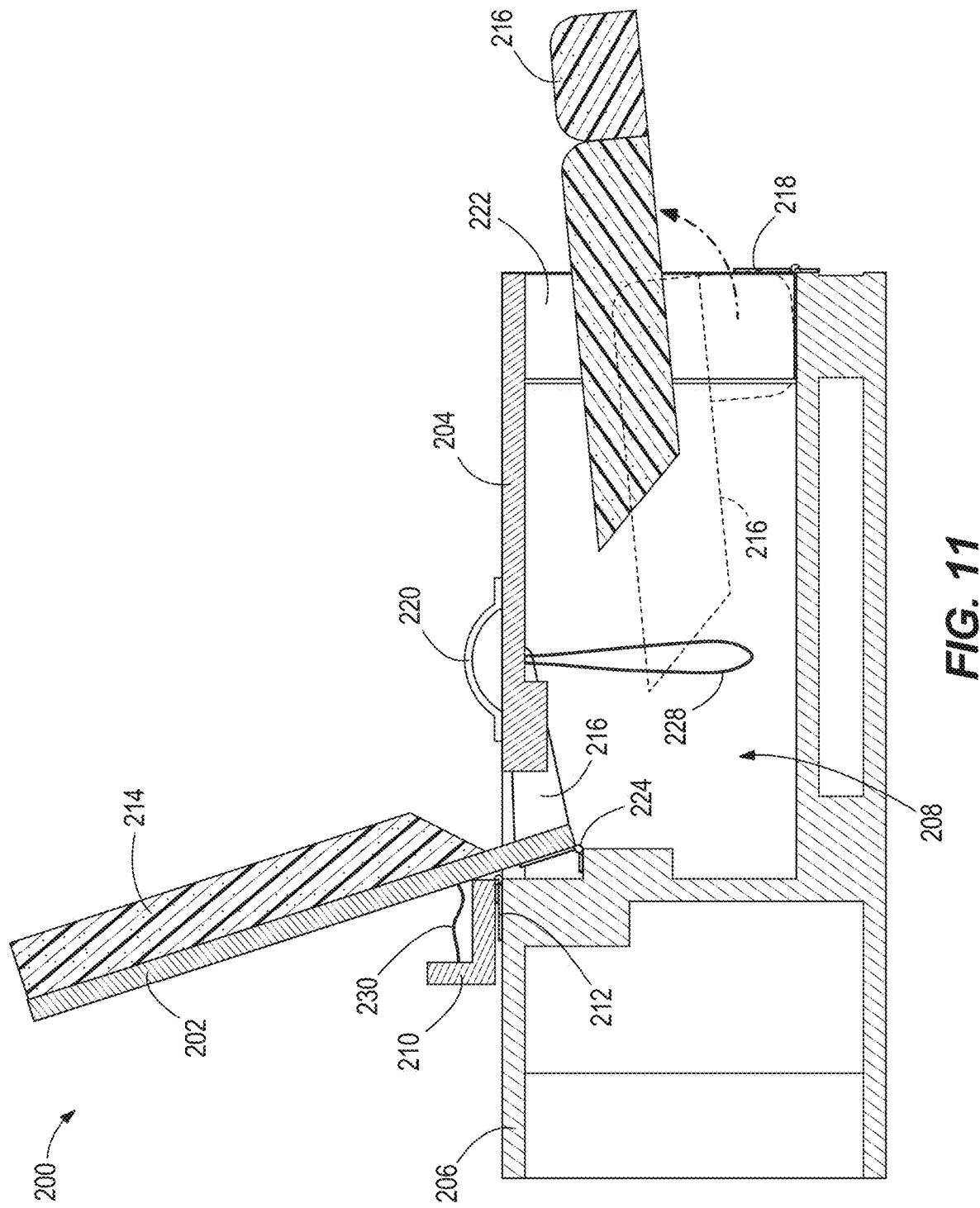
FIG. 11 is another side cross-sectional view of the convertible seating system of FIG. 8 in a partially deployed configuration.
Figure 12:
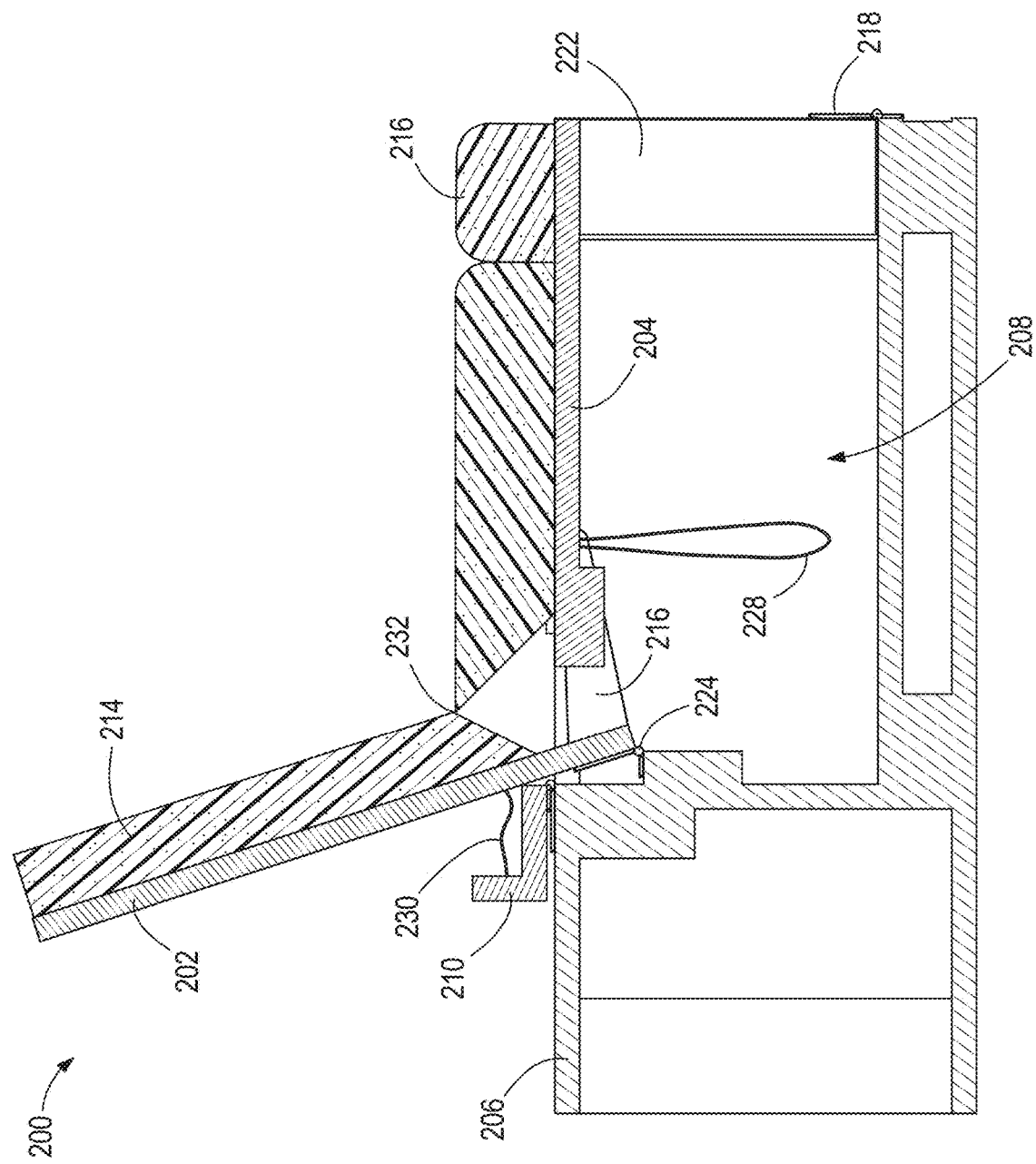
FIG. 12 is a side cross-sectional view of the convertible seating system of FIG. 8 in a fully deployed configuration.

As best shown in FIGS. 11 and 12, the convertible seating system 200 is additionally shown to include a backrest cushion 214 and a seat cushion 216 that increase the comfort and aesthetic qualities of the seating system 200. In one implementation, the backrest cushion 214 is fixedly coupled to the backrest component 202, and the seat cushion 216 is detachably coupled to the seat component 204 using any suitable detachable fastening mechanism (e.g., snaps, magnets, laces or ties). Once the backrest cushion 214 has been rotated to the deployed position, the seat cushion 216 may be removed from the recessed compartment 208 and placed atop the seat component 204. In an alternative exemplary implementation, the backrest cushion 214 may be fixedly coupled to the seat cushion 216 using a fabric hinge (e.g., at cushion joint 232, depicted in FIG. 12) such that the seat cushion 216 rotates out of the recessed compartment 208 with the backrest component 202. Velcro, snaps, or the like may be utilized to secure the seat cushion 216 to the seat component 204 after the seat component 204 has been rotated downwardly into the position flush with the deck surface 206.

In the present disclosure, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A convertible seating system for a marine vessel that is movable between a stowed configuration and a deployed configuration, the convertible seating system comprising:
    a backrest component that is pivotably coupled to a recessed compartment formed in a deck portion of the marine vessel, wherein the backrest component is located inside the recessed compartment when the convertible seating system is in the stowed configuration and outside the recessed compartment when the convertible seating system is in the deployed configuration; and
    a seat component that is pivotably coupled to the recessed compartment, wherein the seat component is flush with the deck portion when the convertible seating system is in the stowed configuration and the deployed configuration;
    wherein the seat component pivots upwardly from the deck portion to permit the backrest component to pivot upwardly from inside the recessed compartment in the stowed configuration to outside the recessed compartment in the deployed configuration.

2. The convertible seating system of claim 1, wherein the seat component pivots upwardly from the deck portion in a first direction to permit the backrest component to pivot upwardly in a second direction, wherein the second direction is opposite the first direction.

3. The convertible seating system of claim 1, wherein the backrest component is pivotably coupled to a rear wall of the recessed compartment and wherein the seat component is pivotably coupled proximate a front end of the recessed compartment opposite the rear wall.

4. The convertible seating system of claim 1, further comprising a backrest biasing device configured to assist in pivoting the backrest component from the stowed configuration to the deployed configuration.

5. The convertible seating system of claim 4, wherein the backrest biasing device is a gas spring.

6. The convertible seating system of claim 4, wherein the backrest biasing device is a tether coupled to the seat component.

7. The convertible seating system of claim 1, further comprising a seat biasing device configured to assist in pivoting the seat component from the stowed configuration to a transitional configuration in which the seat component is pivoted upwardly from the deck portion.

8. The convertible seating system of claim 7, wherein the seat biasing device is a gas spring.

9. The convertible seating system of claim 1, wherein the seat component is retained in the stowed configuration using a cam latch.

10. The convertible seating system of claim 1, further comprising a seat cushion that is detachably coupled to the seat component.

11. The convertible seating system of claim 10, further comprising a backrest stop component coupled to a sidewall of the recessed compartment, wherein the backrest stop component is configured to arrest rotation of the backrest component beyond the stowed configuration.

12. The convertible seating system of claim 11, wherein the seat cushion is configured to be stowed beneath the backrest component in the recessed compartment when the convertible seating system is in the stowed configuration.

13. The convertible seating system of claim 1, further comprising a backrest cushion that is fixedly coupled to the backrest component.

14. The convertible seating system of claim 13, wherein the backrest cushion is coupled to a seat cushion using a fabric hinge.

15. A convertible seating system for a marine vessel that is movable between a stowed configuration and a deployed configuration, the convertible seating system comprising:
    a seat component that is pivotably coupled to a first end of a recessed compartment formed in a deck portion of the marine vessel;

a backrest component that is pivotably coupled to a second end of the recessed compartment, wherein the second end is opposite the first end;

wherein moving the convertible seating system from the stowed configuration to the deployed configuration comprises pivoting the seat component upwardly from the deck portion in a first direction to permit the backrest component to pivot upwardly in a second direction, wherein the second direction is opposite the first direction.

16. The convertible seating system of claim 13, further comprising a first gas spring and a second gas spring, wherein the first gas spring is configured to assist in pivoting the seat component in the first direction and the second gas spring is configured to assist in pivoting the backrest component in the second direction.

17. The convertible seating system of claim 13, wherein the seat component is retained in the stowed configuration using a cam latch.

18. A method of converting a seating system for a marine vessel between a stowed configuration and a deployed configuration, wherein the method comprises:

pivoting a seat component upwardly in a first direction from a seat stowed position in which the seat component is flush with a deck portion of the marine vessel, wherein pivoting the seat component upwardly permits a backrest biasing component to assist in pivoting a backrest component upwardly in a second direction from a backrest stowed position within a recessed compartment formed in the deck portion; and pivoting the seat component downwardly to the stowed position.

19. The method of claim 18, wherein the backrest biasing component comprises a gas spring.

20. The method of claim 18, wherein the backrest biasing component comprises a tether coupled to the seat component.

\* \* \* \* \*